(12) United States Patent
Oguri et al.

(10) Patent No.: US 8,042,066 B2
(45) Date of Patent: Oct. 18, 2011

(54) PERIPHERAL DEVICE

(75) Inventors: Hirofumi Oguri, Nagoya (JP); Tatsuya Sato, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 720 days.

(21) Appl. No.: 12/049,606

(22) Filed: Mar. 17, 2008

(65) Prior Publication Data
US 2008/0244439 A1    Oct. 2, 2008

(30) Foreign Application Priority Data
Mar. 30, 2007   (JP) ................. 2007-091164

(51) Int. Cl.
*G06F 15/00* (2006.01)
*G06F 13/00* (2006.01)
(52) U.S. Cl. ........ 715/859; 715/851
(58) Field of Classification Search .......... 715/700–715, 715/810–813, 851–852, 859, 779, 764–765; 345/173, 176
See application file for complete search history.

(56) References Cited

U.S. PATENT DOCUMENTS

| 6,978,096 | B2 | 12/2005 | Maeshima | |
|---|---|---|---|---|
| 2002/0005839 | A1* | 1/2002 | Nojiri | 345/173 |
| 2006/0083533 | A1* | 4/2006 | Maeshima | 399/82 |

FOREIGN PATENT DOCUMENTS

JP   2004266408 A   9/2004

* cited by examiner

*Primary Examiner* — Cao "Kevin" Nguyen
(74) *Attorney, Agent, or Firm* — Baker Botts L.L.P.

(57) ABSTRACT

A peripheral apparatus is provided. The peripheral apparatus includes a display, the peripheral apparatus being configured to process input images based on one of a plurality of operation conditions displayed on the display, each of the operation conditions comprising a plurality of set items, each of the set items comprising a plurality of possible set values; a setting unit that sets a set value for each of the plurality of set items; an operation condition storing unit that stores the plurality of operation conditions and associated set items and set values; and a display controlling unit that controls the display to array and display the plurality of operation conditions, including setting items and set values corresponding to the respective operating conditions, on the display.

15 Claims, 16 Drawing Sheets

FIG. 4

| | OPERATION CONDITION 1 | OPERATION CONDITION 2 | OPERATION CONDITION 3 | OPERATION CONDITION 4 |
|---|---|---|---|---|
| DATE | 2006/10/21 17:56 | 2006/7/1 13:02 | 2006/1/1 0:01 | 2006/2/15 08:45 |
| SHEET SIZE | A4 | LETTER | LETTER | POSTCARD |
| BRIGHTNESS | +2 | −1 | −2 | +2 |
| CONTRAST | 0 | 0 | −2 | 0 |
| COLOR ADJUST R | 0 | 0 | 0 | 0 |
| COLOR ADJUST G | 0 | 0 | 0 | 0 |
| COLOR ADJUST B | 0 | 0 | 0 | 0 |
| SHEET TYPE | PLAIN SHEET | PLAIN SHEET | PLAIN SHEET | PLAIN SHEET |
| INPUT IMAGE TYPE | TEXT | PHOTO | | TABLE |
| IMAGE QUALITY | HIGH SPEED | HIGH IMAGE QUALITY | STANDARD | STANDARD |
| MAGNIFICATION/ REDUCTION | 100% (EQUAL MAGNIFICATION) | 115% (B5 → A4) | 100% (EQUAL MAGNIFICATION) | 100% (EQUAL MAGNIFICATION) |
| LAYOUT | 2 IN 1 | STANDARD | 4 IN 1 | STANDARD |
| ⋮ | ⋮ | ⋮ | ⋮ | ⋮ |

| | | | | | | |
|---|---|---|---|---|---|---|
| Retrieval | | | Same Setting Sorting: OFF | | | |
| 2006/10/21 17:56 | | | 2006/7/1 13:02 | | | |
| 1 | Sheet Size | A4 | 1 | Sheet Size | Letter Size | |
| 2 | Sheet Type | Plain Sheet | 2 | Sheet Type | Plain Sheet | |
| 3 | Brightness | +2 | 3 | Brightness | -1 | |
| 4 | Contrast | 0 | 4 | Contrast | 0 | |
| 5 | Color Adjust R | 0 | 5 | Color Adjust R | 0 | |
| 6 | Color Adjust G | 0 | 6 | Color Adjust G | 0 | |
| 7 | Color Adjust B | 0 | 7 | Color Adjust B | 0 | |
| 8 | Input Image Type | Text | 8 | Input Image Type | Photograph | |

FIG. 13

| | 53 | 56 | 54 | | | 41 | 54 |
|---|---|---|---|---|---|---|---|
| | Retrieval | Sheet Type: Plain Sheet | | Same Setting Sorting: OFF | | | |
| | 2006/10/21 17:56 | | ▲▼ | 2006/7/1 13:02 | | | ▲▼ |
| 51 | 1 | Sheet Type | Plain Sheet | 1 | Sheet Type | Plain Sheet | 52 |
| | 2 | Sheet Size | A4 | 2 | Sheet Size | Letter Size | |
| | 3 | Brightness | +2 | 3 | Brightness | -1 | |
| | 4 | Contrast | 0 | 4 | Contrast | 0 | |
| | 5 | Color Adjust R | 0 | 5 | Color Adjust R | 0 | |
| | 6 | Color Adjust G | 0 | 6 | Color Adjust G | 0 | |
| | 7 | Color Adjust B | 0 | 7 | Color Adjust B | 0 | |
| | 8 | Input Image Type | Text | 8 | Input Image Type | Photograph | |

FIG. 14

| 53 | 56 | 54 | | | 41 | | 54 |
|---|---|---|---|---|---|---|---|
| Retrieval | Sheet Type: Plain Sheet | | Same Setting Sorting: OFF | | | | |
| 2006/10/21 17:56 | | ▲▼ | 7/1 | 1/1 | 2/15 | 11/5 | ▲▼ |
| 1 | Sheet Type | Plain Sheet | Plain Sheet | Plain Sheet | Plain Sheet | Plain Sheet | |
| 2 | Sheet Size | A4 | Letter Size | Letter Size | Postcard | Postcard | |
| 3 | Brightness | +2 | -1 | -2 | +2 | -2 | |
| 4 | Contrast | 0 | 0 | 0 | -2 | 0 | |
| 5 | Color Adjust R | 0 | 0 | 0 | 0 | 0 | |
| 6 | Color Adjust G | 0 | 0 | 0 | 0 | -2 | |
| 7 | Color Adjust B | 0 | 0 | 0 | 0 | 0 | |
| 8 | Input Image Type | Text | Photograph | | Table | | |

FIG. 16

| | | | | 55 | 53 | | 41 |
|---|---|---|---|---|---|---|---|
| Retrieval | Paper Type: Plain Sheet | | | Same Setting Sorting: ON | | | |
| | 2006/10/21 17:56 | | | 7/1 | 1/1 | 2/15 | 11/5 |
| 1 | Sheet Size | A4 | | Letter Size | Letter Size | Postcard | Postcard |
| 2 | Brightness | +2 | | -1 | 0 | +2 | -2 |
| 3 | Contrast | -2 | | 0 | -2 | -2 | 0 |
| 4 | Color Adjust G | 0 | | 0 | 0 | 0 | -2 |
| 5 | Input Image Type | Text | | Photograph | | Table | |
| 6 | Color Adjust R | 0 | | 0 | 0 | 0 | 0 |
| 7 | Color Adjust B | 0 | | 0 | 0 | 0 | 0 |
| 8 | Sheet Type | Plain Sheet | | Plain Sheet | Plain Sheet | Plain Sheet | Plain Sheet | ns
PERIPHERAL DEVICE

CROSS-REFERENCE TO RELATED APPLICATIONS

This application claims priority from Japanese Patent Application No. 2007-091164 filed on Mar. 30, 2007, the entire subject matter of which is incorporated herein by reference.

TECHNICAL FIELD

Apparatuses consistent with the present invention relate to a peripheral apparatus and, more particularly, to a peripheral apparatus which integrally includes copier, facsimile, printer and scanner functions, and which has enhanced value setting capabilities.

BACKGROUND

There has been proposed a related art peripheral apparatus that integrally includes copier, facsimile, printer and scanner functions and that includes setting items (e.g., paper size, brightness, contrast, magnification and reduction ratios, etc.) that regulate operation conditions for processing an input image. A user is capable of processing an input image under different operation conditions by appropriately varying the set values of such various types of setting items.

For example, JP-A-2004-266408 describes a related art image processing apparatus. The related art image processing apparatus stores operation conditions including set values set by a user in the past and is capable of processing an image under the stored operation conditions. In such a related art image processing apparatus, when operation conditions are stored, the title of operation conditions stored in accordance with the set values set by a user is called, for example, "Taro Yamada A4 Basic". In other words, the title may include a name of the user and a short descriptor. Therefore, in a case in which a plurality of operation conditions are compared with each other, a user compares the titles of respective operation conditions and selects optimal operation conditions. According to such a related art image processing apparatus, since the set values of the operation conditions are obtained by the title set in the past, it is not necessary for a user to set the set values again, and the user is capable of processing images under the same operation conditions any number of times.

BRIEF DESCRIPTION OF THE DRAWINGS

FIG. 4 is a view showing an example of an operation condition storing table;

FIG. 11 shows a example of a display screen displaying operation conditions;

FIG. 13 shows an example of a display screen showing retrieval results;

FIG. 14 shows another example of a display screen showing retrieval results;

FIG. 16 shows an example of a display screen displaying the sorting results.

DETAILED DESCRIPTION

General Overview

Figure 1:
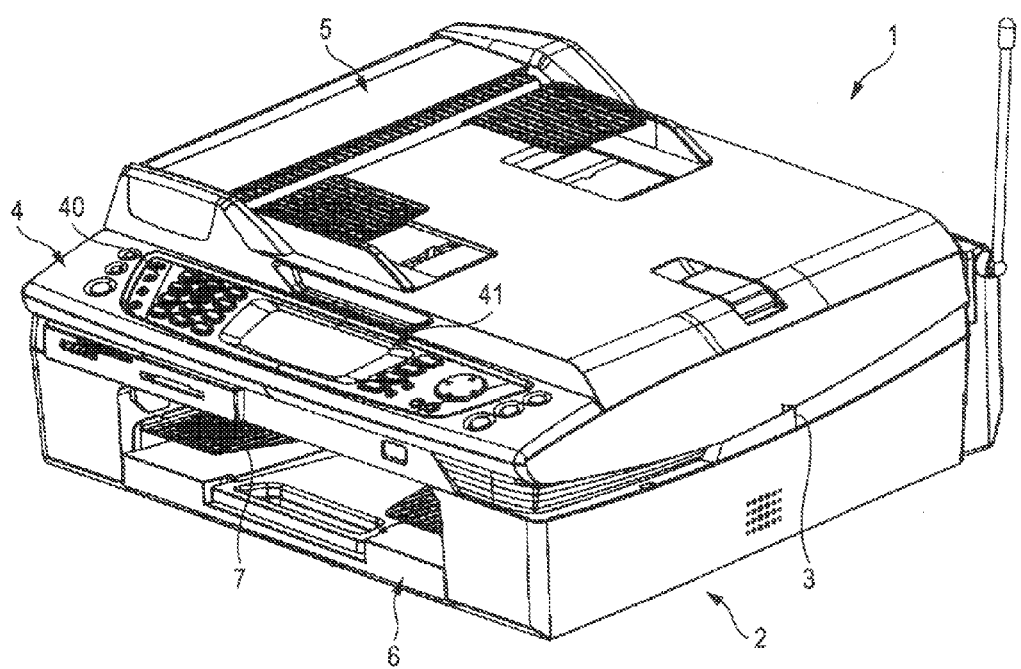
FIG. 1 is an exemplary perspective view of a peripheral apparatus according to an exemplary embodiment of the present invention.

The related art image processing apparatus has a number of disadvantages. For example, when selecting the optimal operation conditions by comparing the titles of respective operation conditions, the titles of respective operation conditions do not meaningfully reflect all of the set values. Thus, there is a problem that it is difficult to understand all of the set values of the operation conditions only by the title of operation conditions.

Accordingly, in order to select the optimal operation conditions among a plurality of operation conditions, it is necessary not only to compare the titles of operation conditions with each other, but also the individual set values of various types of setting items of the respective operation conditions. However, in the related image processing apparatus, in order to check these individual set values, the user must select operation conditions for which detailed set values are to be confirmed, and then press down a button to scroll through the detailed set values. This creates another problem in that it is cumbersome to carry out the operation. Also, since various types of setting items and set values of a plurality of operation conditions cannot be displayed simultaneously, the user must remember the set values of respective operation conditions and then mentally compare them to each other. Thus, there is still another problem that it takes much time and labor to select the optimal operation conditions.

Also, as the number of functions of the related art image processing device increases, the number of individual items that may be set also increases. Thus, it becomes even more cumbersome to select the optimal operation conditions based on only the titles of operation conditions, and the time to compare and select correct operation conditions increases. In particular, this problem is exacerbated because of practical limits to the size of the display screen. In other words, the usable display area on a display screen of an image processing device is limited, thus increasing the labor and time for a user to select desired parameters for the apparatus.

Accordingly, it is an aspect of the present invention to provide a peripheral apparatus capable of easily setting operation conditions when processing an input image in a peripheral apparatus.

According to an exemplary embodiment of the present invention, there is provided a peripheral apparatus comprising a display, the peripheral apparatus being configured to process input images based on one of a plurality of operation conditions displayed on the display, each of the operation conditions comprising a plurality of set items, each of the set items comprising a plurality of possible set values; a setting unit that sets a set value for each of the plurality of set items; an operation condition storing unit that stores the plurality of operation conditions and associated set items and set values; and a display controlling unit that controls the display to array and display the plurality of operation conditions, including setting items and set values corresponding to the respective operating conditions, on the display.

According to another exemplary embodiment of the present invention, there is provided a peripheral apparatus comprising: an operation condition storing unit that stores a plurality of operation conditions, the operating conditions controlling processing of images by the peripheral apparatus, each operating condition comprising a plurality of set items, each set item comprising a plurality of possible set values; a setting unit that sets a set value among the plurality of possible set values for each of the set items; a display comprising at least two display areas; and a display controlling unit that controls the display to display one of the plurality of operation conditions in each of the at least two display areas.

Exemplary Embodiments

Hereinafter, exemplary embodiments of the present invention are described with reference to the accompanying drawings.

FIG. 1 is an exemplary perspective view of a peripheral apparatus 1 according to an exemplary embodiment of the present invention. The peripheral apparatus 1 integrally includes a printer portion 2 at its lower part and a scanner portion 3 at its upper part. The peripheral apparatus 1 integrally includes a function as a printer that receives image data from a PC (not illustrated) to which the printer is connected, and prints the image data received by the printer portion 2, a function as a scanner that transmits the image data read by a scanner portion 3 to a PC to which the scanner is connected, a function as a facsimile that transmits the image data read by the scanner portion 3 to other facsimile terminals (not illustrated), and that receives image data transmitted by other facsimile terminals and prints the same image data by the printer portion 2, and a function as a duplicator that prints the image data read by the scanner portion 3 and prints the same by the printer portion 2.

When executing these functions, various types of setting items and set values that regulate the operation conditions of the peripheral apparatus are set in the peripheral apparatus 1. For example, in a case of copying, there are setting items, for example, a sheet size, a brightness, a contrast, and magnification or reduction ratios, etc. Furthermore, there is a plurality of potential values (herein after called set values) for each of the setting items. For example, where the setting item is sheet size, the set values may be, for example, A4 size, letter size or postcard size, etc. The set values of various types of setting items are set to certain values and these values are used by the peripheral apparatus 1 in carrying out the various functions of the peripheral apparatus 1.

An operation panel portion 4 which is used to operate the printer portion 2 and the scanner portion 3 is provided at the front upper part of the peripheral apparatus 1 in FIG. 1. The operation panel portion 4 is composed of various types of operation keys 40 (e.g., a setting unit, an operation condition selecting unit, etc.) and a liquid crystal display portion 41 (i.e., a display screen). The peripheral apparatus 1 operates based on operation instructions given from the operation panel portion 4. Alternatively, the peripheral apparatus 1 may operate based on commands received from a terminal (not shown) which is coupled to the peripheral apparatus 1. The liquid display portion 41 displays a message for guiding various types of menus and operating methods. Furthermore, a plurality of stored operation conditions are displayed along with the setting items and set values thereof.

The peripheral apparatus 1 includes an automatic document feeder (ADF) 5 at the upper part thereof. The ADF 5 feeds a plurality of sheets set therein to the scanner portion 3 one after another and discharges a document from which data is read by the scanner portion 3.

A sheet feeding cassette 6 for accommodating sheets as a plurality of recording media on its bottom part in a stacked state is disposed at the lower central part of the peripheral apparatus 1, and is composed so as to be detachable from a front opening part of the peripheral apparatus 1.

A sheet discharging tray 7 is disposed at the front opening part of the peripheral apparatus 1 above the sheet feeding cassette 6. Recording sheets are conveyed from the sheet feeding cassette 6 to the printer portion 2, and are discharged to the sheet discharging tray 7 after being recorded.

Figure 2:
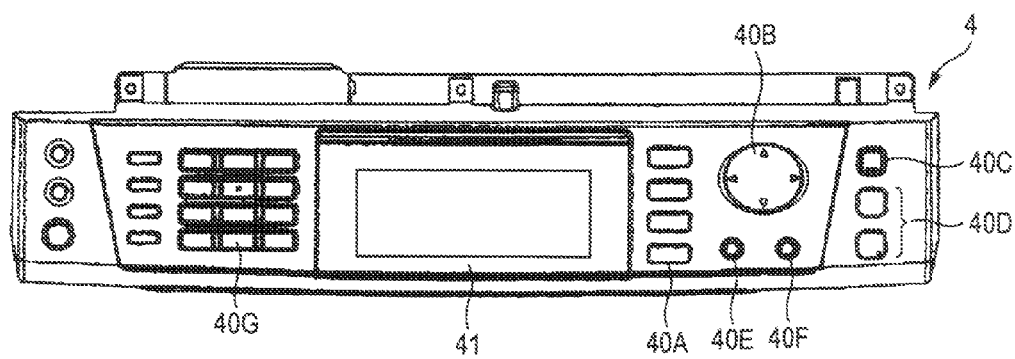
FIG. 2 is an exemplary plan view showing an operation panel of the peripheral apparatus of FIG. 1.

FIG. 2 is an exemplary plan view showing the operation panel portion 4 of the peripheral apparatus 1. As shown in FIG. 2, the operation panel portion 4 includes various types of operation keys 40 (40A through 40G) and a liquid crystal display portion 41. As shown in FIG. 2, the liquid crystal display portion 41 is a laterally long and rectangular in its plan view. The operation keys 40 are provided around the liquid crystal display portion 41, and are largely divided into operation keys 40A through 40F provided on a right hand side of the operation panel and ten keys 40G provided on a left hand side of the operation panel. However, the operation keys 40 may, of course, be provided in any configuration so as to be convenient for a user.

The operation keys 40 include a mode key 40A, a cursor key 40B, a stop/end key 40C, a plurality of start keys 40D, an operation condition key 40E, a preview key 40F, and a plurality of numeral keys 40G. The mode key 40A is used to change a mode by which a scanner function, a facsimile function and a copier function included in a peripheral apparatus 1 can be set. The cursor key 40B is used to move the position intended for instruction and operation on a display screen displayed on the liquid crystal display portion 41. The stop/end key 40C is used to discontinue an operation and to finish setting. The start keys 40D are used to commence an operation such as scanning, facsimile, copying, etc. One of the start keys 40D is used to commence color scanning, facsimile, copying, etc., by being pressed, and the other thereof is used to commence monochromatic scanning, facsimile, copying, etc., by being pressed. The operation condition key 40E is used to call up stored operation conditions. The preview key 40F is used to display a result obtained by processing an input image based on a selected operation condition. The plurality of numeral keys 40G comprise twelve code keys of ten numeral keys from 0 to 9 and two keys of * and #, respectively. Further, additional symbols, for example, KANA letters (Japanese syllabary), alphabet, a semi-voiced sound symbol, a voiced sound symbol, and other symbols are assigned to respective ones of the plurality of numeral keys 40G such that the symbols can be input by using the keys 40G.

Thus, a desired set value may be set and input characters may be entered by pressing respective ones of the operation keys 40A through 40G.

In addition, the liquid crystal display portion 41 displays various types of menus and various types of display screens, etc.

Figure 3:
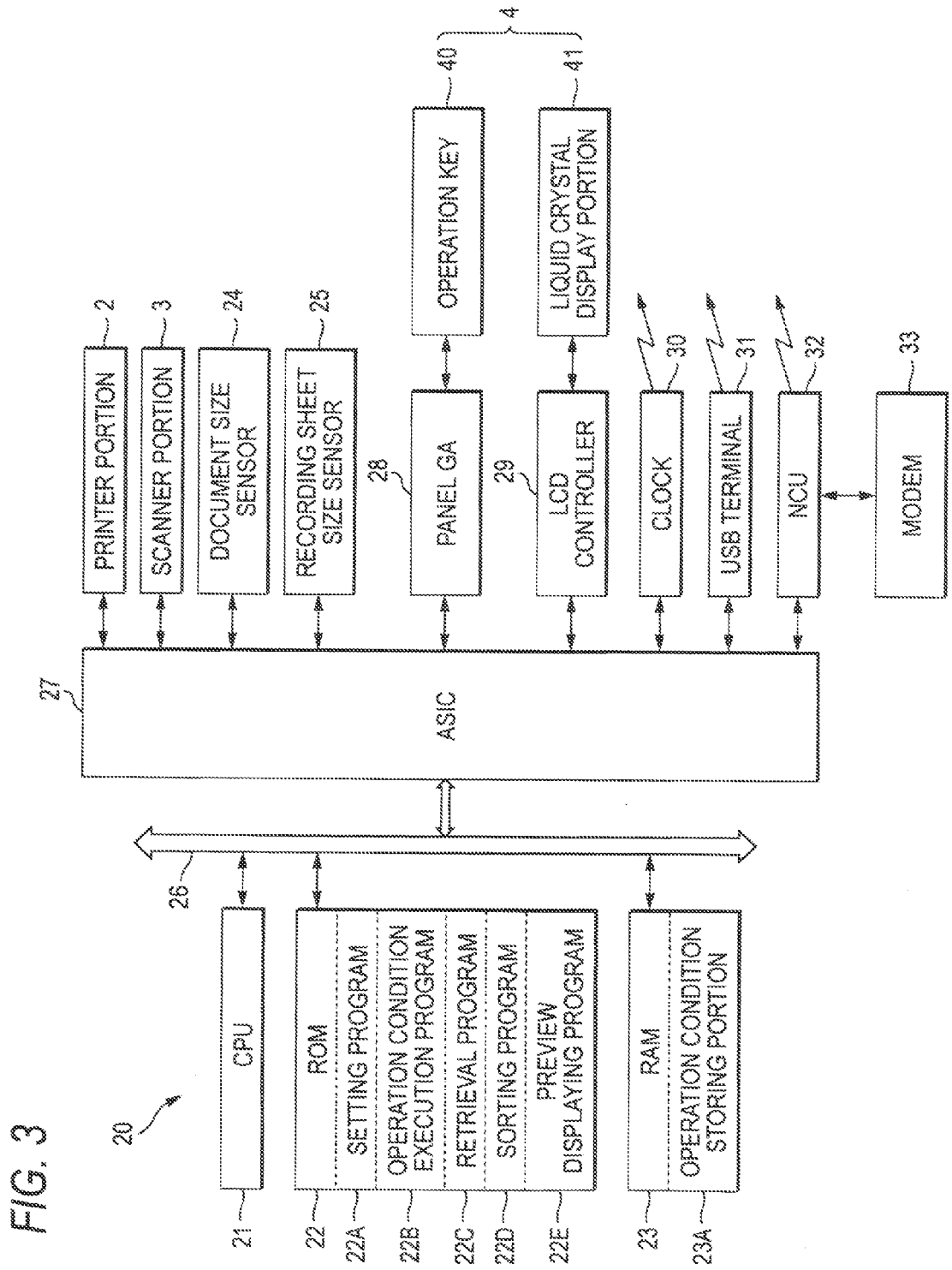
FIG. 3 is a view showing a configuration of a controller of the peripheral apparatus of FIG. 1.

FIG. 3 is a view showing a configuration of a controller 20 of the peripheral apparatus 1 according to an exemplary embodiment of the present invention. The controller 20 controls operations of the peripheral apparatus 1 including the printer portion 2, the scanner portion 3 and the operation panel portion 4. The controller 20 comprises a central processing unit (CPU) 21, a read only memory (ROM) 22, and a random access memory (RAM) 23 as shown in FIG. 3. The controller 20 is coupled to an application specific integrated circuit (ASIC) 27 via a bus 26. Further, the printer portion 2, the scanner portion 3, a document size sensor 24, a sheet size sensor 25, a panel gate array (Panel GA) 28 coupled to the operation keys 40, a liquid crystal display (LCD) controller 29 coupled to the liquid crystal display portion 41, a clock 30, a universal serial bus (USB) terminal 31, and a network control unit (NCU) 32 coupled to a modem 33 are coupled to the ASIC 27.

The CPU 21 carries out various types of numerical calculations, information processing, and hardware control in accordance with programs stored in the ROM 22. Although characteristic functions of the CPU 21 according to exemplary embodiments of the present invention will be described later, the functions of the CPU 21 include setting of set values of various types of setting items to regulate operation conditions, display and retrieval of stored operation conditions, sorting of the setting items, and display of image processed results of an input image based on a selected operation condition.

The ROM 22 stores various types of control programs for controlling a printer function, scanner function, facsimile function and copier function, respectively, and constants and tables used for the control programs. Further, the ROM 22 also stores a setting program 22A, an operation condition executing program 22B, a retrieval program 22C, a sorting program 22D, and a preview display program 22E. These programs will be described in detail later.

The RAM 23 is a randomly accessible memory, which comprises a work area that provisionally stores variables and parameters when the CPU 21 executes a control program, and an operation condition storing portion 23A for storing a plurality of operation conditions regulated by set values of the setting items.

Also, the operation condition storing portion 23A stores a plurality of operation conditions regulated by set values of various types of setting items. The plurality of operation conditions are stored as operation condition storing tables classified function by function with respect to printer function, scanner function, facsimile function, and copier function, etc. FIG. 4 is a view showing an example of an operation condition storing table 10 for copying. In FIG. 4, the operation condition storing table 10 comprises various types of setting items pertaining to copying, and operation conditions 1 through 4 corresponding to the set values. As shown in FIG. 4, the setting items comprise, for example, sheet size, brightness, contrast, color adjustment R, color adjustment G, color adjustment B, sheet type, image quality, magnification/reduction ratio, layout, etc. pertaining to copying, and there are also a plurality of set values set, respectively, for each setting item. The setting items for copying are not limited to those described above, and the operation conditions that comprise the operation condition storing table 10 are not limited to four types as shown in FIG. 4.

In addition, the operation condition storing portion 23A stores types of images in addition to the copying setting items. For example, the setting items also comprise a "type of input image," having set values of "text" and "photograph" that may also be set in the operation condition storing table 10 of FIG. 4. A type of image suitable for the operation condition may be stored by setting the set values of the type of input image when setting the operation conditions. Thus, it is possible to quickly select the operation condition suitable for the type of image when it is desirable to process an input image by selecting the most suitable operation conditions from a plurality of stored operation conditions.

The ASIC 27 controls the operation of the printer portion 2 and the scanner portion 3 in accordance with an instruction from the CPU 21. Although a detailed description of the printer portion 2 and the scanner portion 3 is omitted, the controller 20, for example, controls a motor for driving the printer portion 2, the ink jet recording head, a motor for driving the scanner portion 3, and operations of an image reading unit, etc.

A document size sensor 24 that detects the size of a document set with respect to the scanner portion 3 is coupled to the ASIC 27. The document size sensor 24 is provided, for example, in the ADF 5 and detects regular standardized sizes such as A4 size, B5 size, letter size, etc.

The sheet size sensor 25 that detects the size of sheets set with respect to the printer portion 2 is coupled to the ASIC 27. The sheet size sensor 25 is provided in the sheet feeding cassette 6, which detects regular standardized sizes such as A4 size, letter size, and postcard size, etc., as in the document size sensor.

The panel GA 28 that controls operation keys 40 for inputting desired instructions to the peripheral apparatus 1 is coupled to the ASIC 27. The panel GA 28 detects pressing of any one of the operation keys 40 and outputs predetermined key codes. The key codes are assigned to correspond to a plurality of operation keys 40. The CPU 21 carries out a control process to be executed, in accordance with a key processing table when receiving a key code from the panel GA 28. The key process table is tabulated by matching the key codes and control process, and for example, is stored in the ROM 22.

The LCD controller 29 that controls screen display of the liquid crystal display portion 41 is coupled to the ASIC 27. The LCD controller 29 causes, based on instruction of the CPU 21, the liquid crystal display portion 41 to display information and operation conditions regarding operations of the printer portion 2 or the scanner portion 3.

Also, a clock 30 that counts the current time, and the USB terminal 31 that carries out transmission of data to and receiving thereof from a computer via a USB cable are coupled to the ASIC 27. Furthermore, an NCU 32 and a modem 33, which achieve the facsimile function, are coupled to the ASIC 27.

Figure 5:
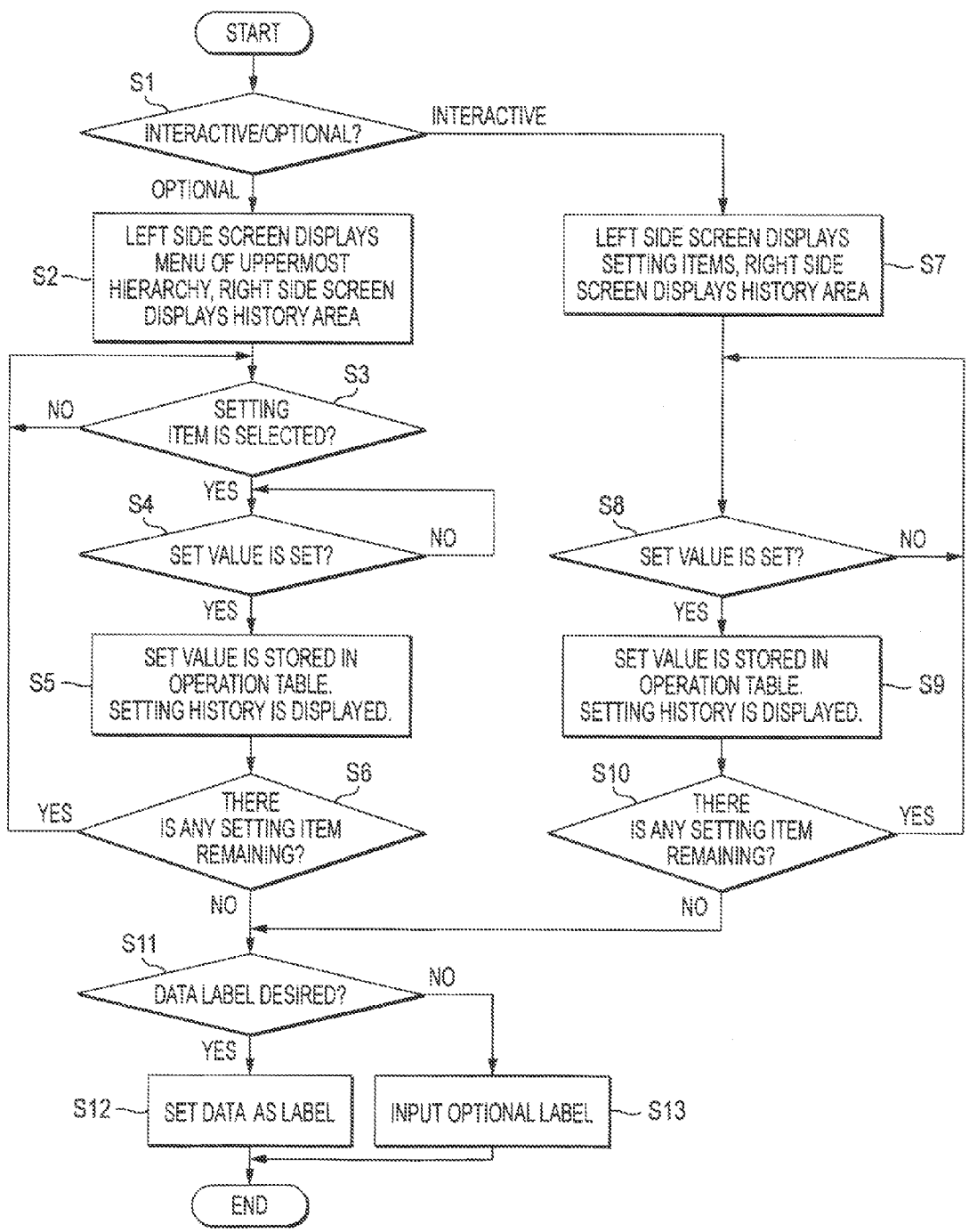
FIG. 5 is a flowchart showing a setting program according to an exemplary embodiment of the present invention.

Next, a description is given of setting of operation conditions of the peripheral apparatus 1 according to an exemplary embodiment of the present invention with reference to FIG. 5 through FIG. 9. FIG. 5 is a flowchart showing a series of operations that are executed by the CPU 21 in relation to the setting program 22A. FIGS. 6 through 9 are examples of display screens used for setting set values of various types of setting items.

When a document is set on the document table on the upper surface of the ADF 5 or the scanner portion 3, and processing of the peripheral apparatus 1 commences, the mode key 40A is pressed and a function of the peripheral apparatus 1 is selected. For purposes of this example, it is assumed that a copier function is selected. The display then is turned to a setting screen for copying.

In FIG. 5, a display format of the setting screen is selected (S1). In this exemplary embodiment, it is possible to select an interactive type or an optional type display method. The interactive type is such that all the setting items and all the set values, which are included in the operation conditions, are displayed one after another, and the set values are determined in accordance with the instructions. In contrast, the optional type is such that the respective setting items are displayed hierarchically, and the setting values are set by selecting setting items desired to be changed therefrom. For example, a hierarchical menu for sheet setting includes setting items such as sheet size and sheet type. When a sheet size is set, such a display format is taken in which a sheet size is selected after selecting the sheet setting, and further a set value of the sheet size is set. In addition, default set values are set in advance in regard to the set values of respective setting items. If the default value is accepted, the default value is determined without varying the set value. Thus, the set value is changed only when it is desired to vary the default set value.

If it is determined that the interactive type is selected (S1: Interactive type), the CPU 21 drives the LCD controller 29, and causes the liquid crystal display portion 41 to display a display screen as shown in FIG. 6 (S7).

Figure 6:
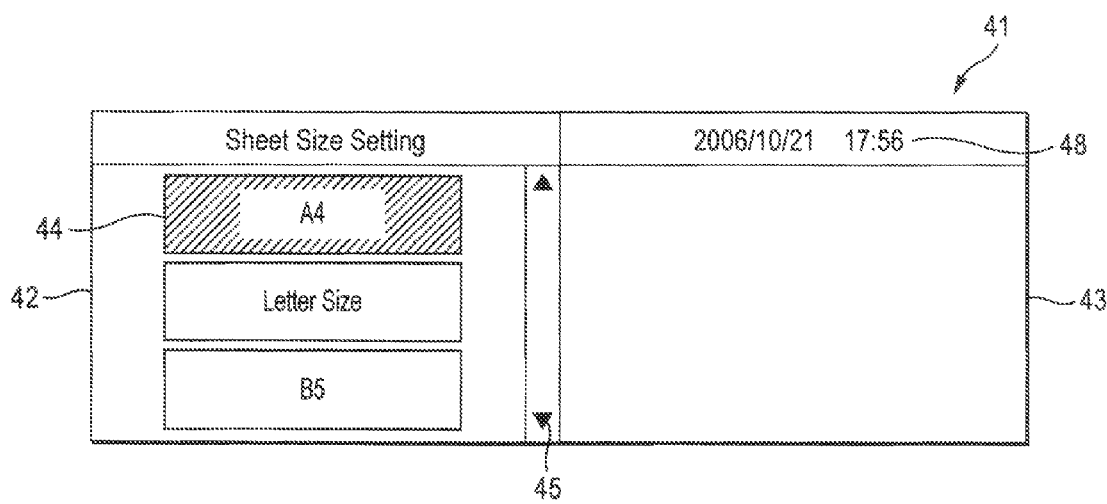
FIG. 6 shows an example of a display screen where set values of respective setting items are set.

FIG. 6 is a display screen used for setting the set values of the setting items. The liquid crystal display portion 41 has two display areas which are a setting value setting area 42 and a setting history display area 43. The setting value setting area 42 displays setting items and a plurality of set values corresponding to the setting items. In FIG. 6, sheet sizes are displayed as the setting item, and A4 size, letter size and B5 size are displayed as the set values. In addition, the cursor 44 displays the currently selected item in a reversed state. For example, in FIG. 6, A4 size of the set values is selected. If the setting items displayed in the setting value setting area 42 cannot not accommodated in one screen, a scroll bar 45 is displayed, and the remaining set values may be displayed by vertically operating the cursor key 40B. In contrast, only the setting items that have already been determined, and the set values thereof are displayed in the setting history display area 43. Furthermore, a present time 48 at which a set value has been changed is acquired by the clock 30 and is simultaneously displayed.

Figure 7:
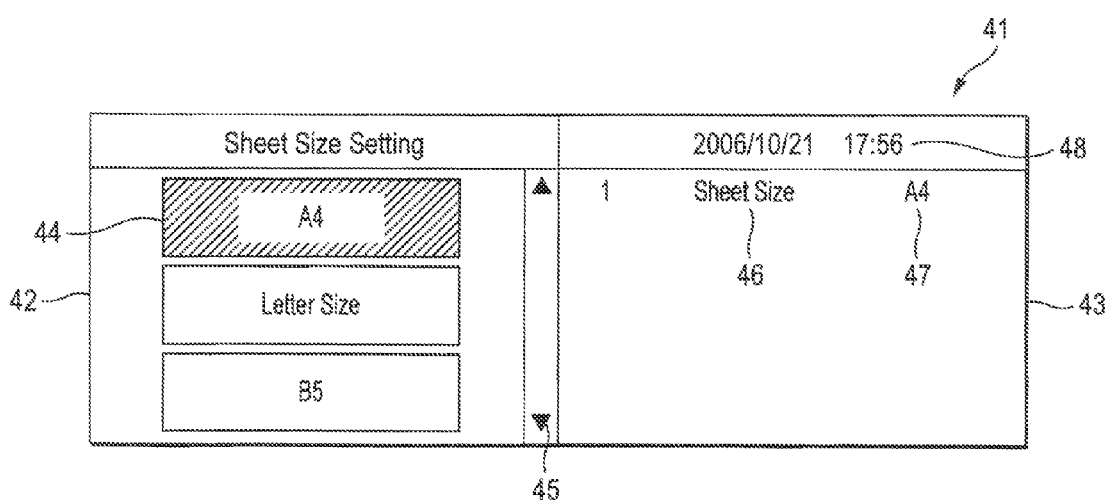
FIG. 7 shows an another example of a display screen where set values of respective setting items are set.

Subsequently, returning to FIG. 5, the CPU 21 determines whether the set values are set in the set value setting area 42 (S8). If the sheet size is desired to be A4 size, the cursor 44 is moved by vertically operating the cursor key 40B, and the A4 size is selected from a plurality of set values displayed in the set value setting area 42. If the CPU 21 determines that the set value has been selected (S8: YES), the CPU 21 prepares an operation condition storing table 10 (FIG. 4) based on the sheet size A4 size having been set, and stores the same in the operation condition storing portion 23A. Continuously, the CPU 21 drives the LCD controller 29 and causes the setting history area 42 to display that the sheet size is selected as the setting item 46 and the A4 size is selected as the set value 47, as shown in FIG. 7 (S9).

Thus, since the setting screen of setting items is displayed at one side, and the setting items already set and the set values thereof are displayed on the other side, it is possible to set the set values of the setting items that are not set yet, by referencing the set values already set.

In contrast, if it is determined that the set value is not set (S8: NO), operation S8 is repeated until the set value is determined.

Figure 8:
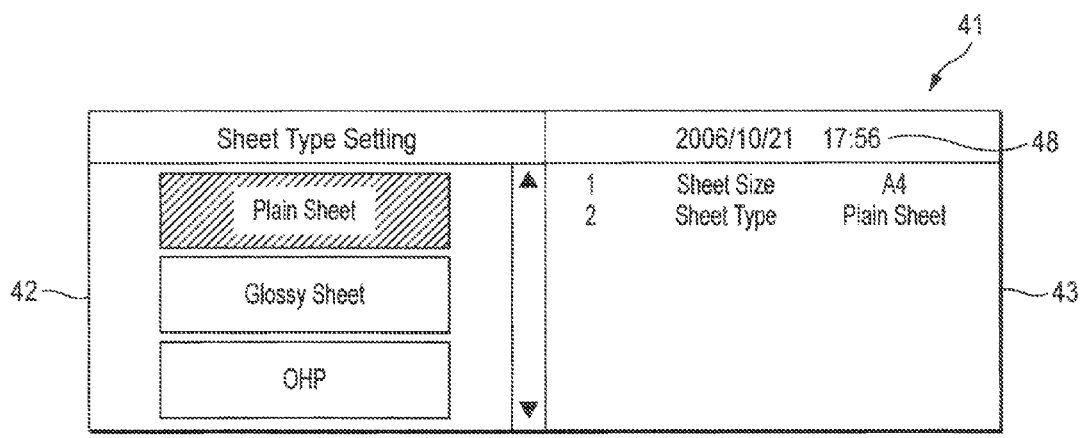
FIG. 8 shows an yet another example of a display screen where set values of respective setting items are set.

Next, the CPU 21 determines whether there is any setting item that is not set (S10). If it is determined that there is a setting item that is not set (S10: YES), the CPU 21 repeats setting of the set value, and, as shown in FIG. 8, causes the set value setting area 42 to display a sheet size, which is a next setting item to be set, and the set value thereof (S8). Further, the CPU 21 repeats the setting operation of the set value. In the setting history display area 43 of FIG. 8, it is displayed that a plain sheet has been set as the sheet type.

Figure 9:
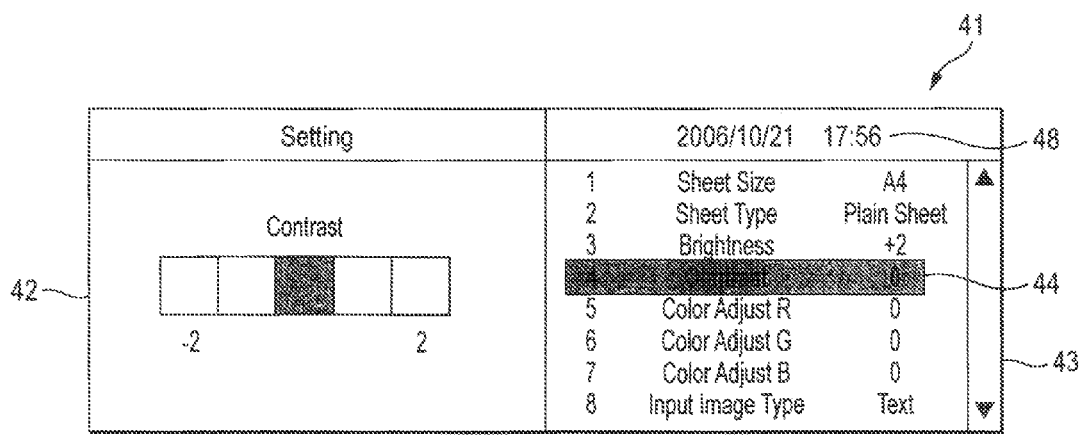
FIG. 9 shows an yet another example of a display screen where set values of respective setting items are set.

Thus, as the set values are repeatedly set, the setting history display area 43 displays a list of the setting items already set and the set values thereof as shown in FIG. 9. If the cursor 44 is moved from the set value setting area 42 to the setting history display area 43 by laterally operating the cursor key 40B, and one setting item is selected from the list, the setting item at which the cursor 44 is positioned is displayed on the set value setting area 42 along with the set value, wherein the set value may be varied in the set value setting area 42.

In contrast, if it is determined in FIG. 5 that there is no setting item that is not set (S10: NO), the CPU 21 finishes the selection screen of the setting items, and determines whether a date label is desired (S11).

At operation S1, if the optional type is selected as the selection screen of the setting items (S1: Optional type), the CPU 21 drives the LCD controller 29 and displays a hierarchical menu of setting items in the set value setting area 42 of the liquid crystal display portion 41. The setting items already set and the set values thereof are displayed in the setting history display area 42 as a history (S2).

Next, the CPU 21 determines whether the setting item is selected (S3). If it is determined that no operation is carried out and the setting item is not selected (S3: NO), the CPU 21 repeats operation S3. In contrast, if the operation key 40 is operated and a setting item desired to be set is selected from the hierarchical menu of the setting items displayed in the set value setting area 42, the CPU 21 determines that the setting item has been selected (S3: YES), and it is determined whether the set value has been set (S4).

If it is determined that the set value has been set (S4: YES), the CPU 21 prepares an operation condition storing table 10 based on the setting items already set and the set values thereof, and stores the same in the operation condition storing portion 23A. The CPU 21 drives the LCD controller 29 and displays the selected items set in the setting history display area 43 of the liquid crystal display portion 41 and the set values thereof (S5). In contrast, if it is determined that the set value is not set (S4: NO), the CPU 21 repeats operation S4.

The CPU 21 then determines whether there are still setting items not set yet (S6). If the operation key 40 is operated again and setting items desired to be set are selected from the hierarchical menu of the setting items displayed in the setting value setting area 42, it is determined that there are still setting items (S6: YES), and the CPU 21 returns to operation S3 and repeats the setting operation of the set values. In contrast, if it is determined that no operation is carried out and there is no setting item not set (S6: NO), the CPU 21 determines whether the date label is desired (S11).

If it is determined that the date label is desired (S11: YES), the CPU 21 acquires the current time 48 from the clock 30, adds the same to the operation condition storing table 10, and sets the date label (S12). The date label is a label to distinguish the operation conditions and is used to sort (re-arrange) the operation conditions by date. In contrast, if it is determined that no date label is desired (S11: NO), the CPU 21 displays a prompt to input an optional label using characters and symbols to distinguish the operation conditions. (S13). Thus, when the date label or an optional label is input, the CPU 21 adds the date label or the optional label to the operation condition storing table 10 and finishes the setting program 22A.

Subsequently, a copying job, etc., is carried out in accordance with an operation instruction given using the operation key 40. For example, the start key 40D is pressed down, and copying is commenced according to the operation conditions based on the set values set by the above-described setting operation. In contrast, if the stop/finish key 40C is pressed down, the copying mode is finished without carrying any copying work.

Figure 10:
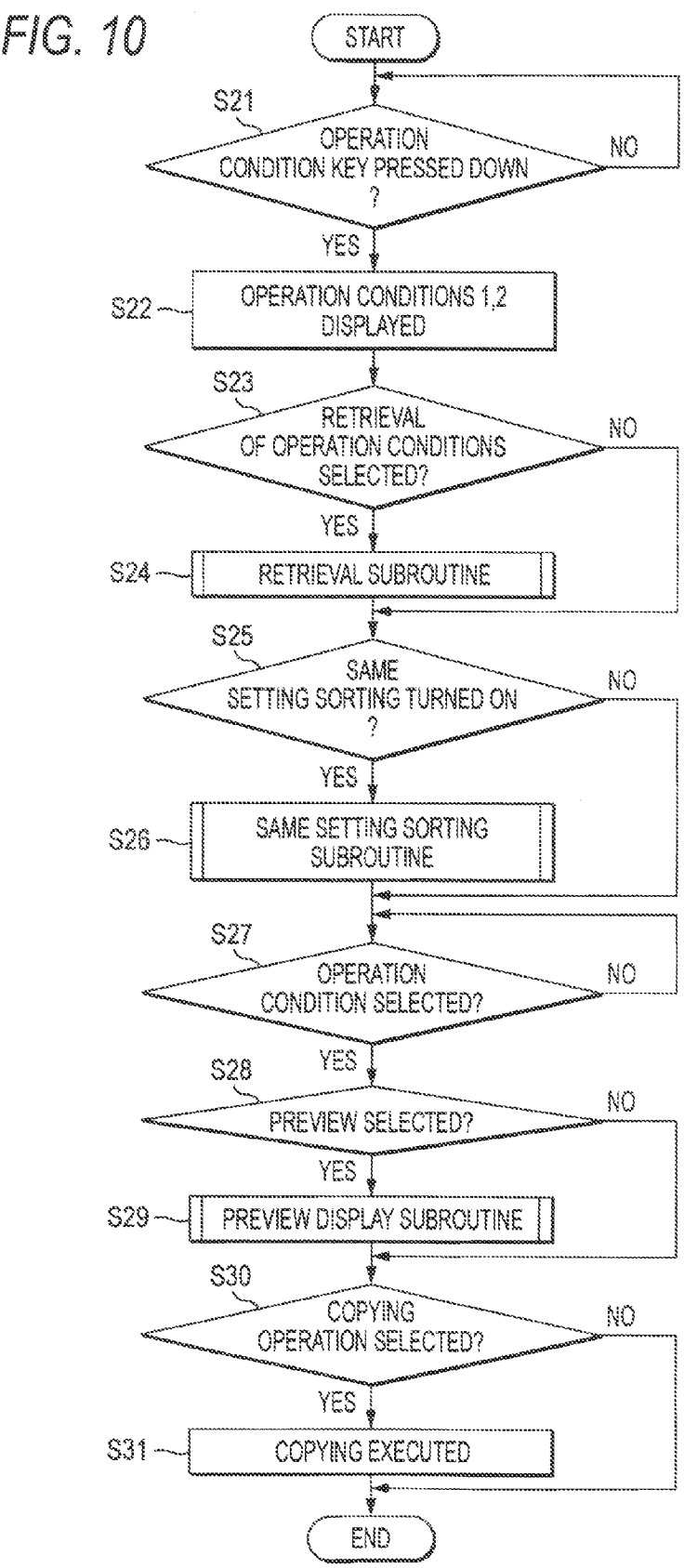
FIG. 10 is a flowchart showing an operation condition execution program according to an exemplary embodiment of the present invention.
Figure 18:
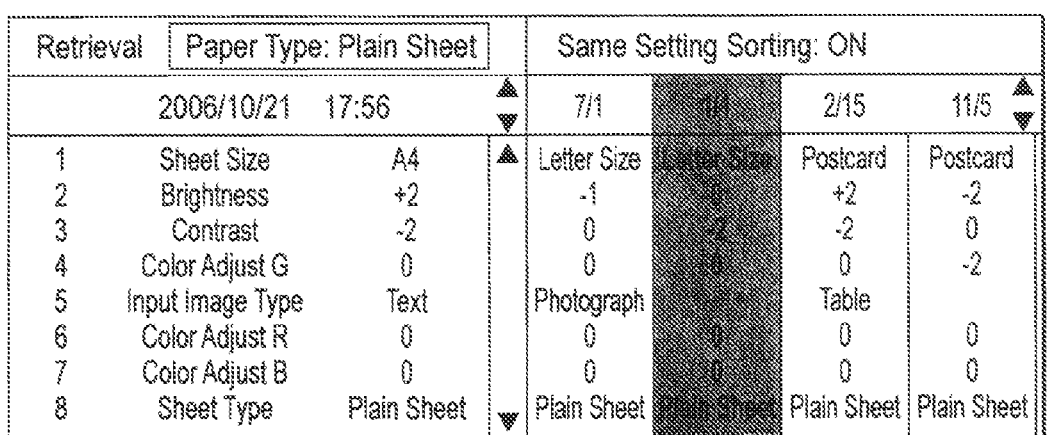
FIG. 18 shows an example of a display screen displaying a selection screen of operation conditions.
Figure 19:
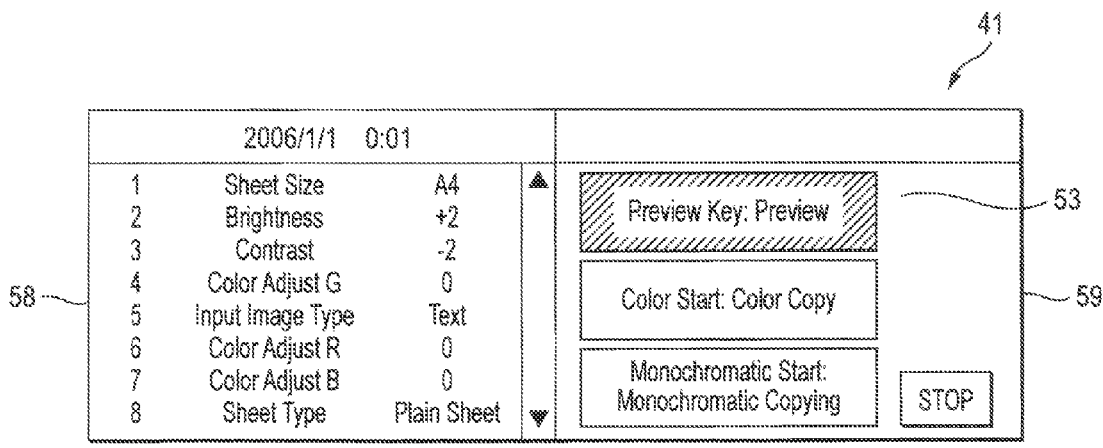
FIG. 19 shows an example of a display screen for instructing an operation based on a selected operation condition.

Next, a description is given of an operation where an image process is carried out based on the operation conditions stored in the operation condition storing table 10 with reference to FIGS. 10, 11, 18 and 19. FIG. 10 is a flowchart showing a series of operations by the CPU 21 based on the operation condition operation program 22B. FIG. 11 is an example of a display screen of the operation conditions. FIG. 18 is an example of a display screen when selecting the operation condition. FIG. 19 is an example of a display screen to designate the operation based on the selected operation conditions.

When a document is set on the document table on the upper surface of the ADF 5 or the scanner portion 3 and processing of the peripheral apparatus 1 is commenced based on the operation conditions included in the operation condition storing table 10, the mode key 40A is pressed and a function of the peripheral apparatus 1 is selected. Herein, it is assumed that the copying function has been selected. Subsequently, in FIG. 10, the CPU 21 determines whether the operation condition key 40E is pressed down (S21). If it is determined that the operation condition key 40E is pressed down (S21: YES), the CPU 21 reads operation condition 1 and 2 of the copying conditions from the operation condition storing table 10, as shown in FIG. 11, and the operation conditions are displayed on the liquid crystal display portion 41 (S22).

In FIG. 11, the liquid crystal display portion 41 displays the operation conditions 1 and 2 included in the operation condition storing table 10 on the operation condition display areas 51 and 52. The operation condition display areas 51, 52 display a list of date label, setting items and set values of the operation conditions. If the list cannot be displayed in one screen, a scroll bar is displayed, wherein by vertically operating the cursor key 40B, the remaining setting items and the set values thereof, which are not displayed, can be confirmed. In addition, separately therefrom, a scroll button 54 is displayed in each of the operation condition display areas 51, 52, respectively. These scroll buttons 54 are used if two or more operation conditions are included in the operation condition storing table 10 to display other operation conditions which are not displayed.

Thus, since a plurality of operation conditions are displayed simultaneously, it is possible to easily compare the set values of respective operation conditions with each other, and it is possible to quickly find a desired operation condition from a plurality of stored operation conditions. Also, the display pattern is not limited to the pattern shown in FIG. 11. Additionally, according to another exemplary embodiment, two or more operation condition display areas may be provided as shown in FIG. 14. Moreover, it is possible to set a number of operation condition display areas which can be displayed on one screen. Thus, by setting the number of operation condition display areas, the operation conditions can be compared as is most advantageous.

Furthermore, in FIG. 11, a setting sorting status 55 and a retrieval bar 56 are displayed on the liquid crystal display portion 41 in areas other than the operation condition display areas 51 and 52. The setting sorting status 55 displays the same whether the function of re-arranging setting items (i.e., same setting sorting, which will be described in detail later) is turned ON or OFF, when there are setting items, among a plurality of operation conditions displayed, for which the set values are the same. The retrieval bar 56 is an area for inputting a keyword to retrieve the operation conditions.

In addition, the liquid crystal display portion 41 displays the item selected, to which the cursor 53 is set, in a reversed state. By operating the cursor key 40B, the cursor 53 may be moved and a desired item selected. For example, FIG. 11 shows a state in which the retrieval bar 56 is selected.

Returning to FIG. 10, the CPU 21 determines whether retrieval of an operation condition is selected (S23). If the cursor 53 is moved to the retrieval bar 56 and the retrieval bar is selected, the CPU 21 determines that retrieval is selected (S23: YES), and the process is shifted to a retrieval subroutine (S24). The retrieval subroutine will be described in detail later. On the other hand, if it is determined that no retrieval is selected (S23: NO) or that the retrieval subroutine is finished, the CPU 21 determines whether a same setting sorting status 56 is turned ON (S25).

If the cursor 53 is moved to the same setting sorting status 56 and the same setting sorting status 56 is turned ON, the CPU 21 determines that the same setting sorting is carried out (S25: YES), and the same setting sorting subroutine is commenced (S26). The same setting subroutine will be described in detail later. In contrast, if it is determined that the same setting sorting remains turned OFF (S25: NO) or that the same setting sorting subroutine is finished, the CPU 21 causes a selection screen of operation conditions as shown in, for example, FIG. 18 to be displayed on the liquid crystal display portion 41, and determines whether an operation condition is selected (S27).

As shown in FIG. 18, if the cursor 53 is moved to one of the operation condition display areas and an operation condition is selected, the CPU 21 determines that the operation condition has been selected (S27: YES), and, as shown in FIG. 19, the CPU 21 displays the selected operation condition display area 58 and the operation instruction display area 59, wherein it is determined whether a preview display is executed (S28). In contrast, if it is determined that the operation condition is not selected (S27: NO), the CPU 21 returns to operation S27.

In FIG. 19, the liquid crystal display portion 41 displays the selected operation condition display area 58, which displays a selected operation condition, and the operation instruction display area 59 to instruct an operation based on the selected operation condition. The selected operation condition display area 58 displays the setting items of the selected operation condition and the set values thereof in a list format. In addition, the operation instruction display area 59 displays selection items for requesting a preview display, color copying, monochromatic copying, and a discontinuance of copying as operation instructions.

Next, if a preview key 40F in the operation instruction display area 59 of FIG. 19 is selected, the CPU 21 determines that an input image is processed based on a selected operation condition and a preview is displayed (S28: YES), and executes a preview display subroutine (S29). The preview display subroutine will be described in detail later. In contrast, if it is determined that no preview display is selected (S28: NO) or if the preview display subroutine is finished, the CPU 21 determines, in the operation instruction display area 59 of the display screen of FIG. 19, whether a copy operation instruction is selected (S30).

If the start key 40D is pressed down to commence color copying or monochromatic copying in the operation instruction display area 59 of FIG. 19, the CPU 21 determines that a copying instruction is selected (S30: YES), and finishes the operation condition execution program 22B after a copying operation is carried out (S31). In contrast, if the stop key 40C is pressed down in the operation instruction display area 19 of FIG. 19, the CPU 21 determines that there is no operation instruction (S30: NO), and finishes the operation condition execution program 22B.

Figure 12:
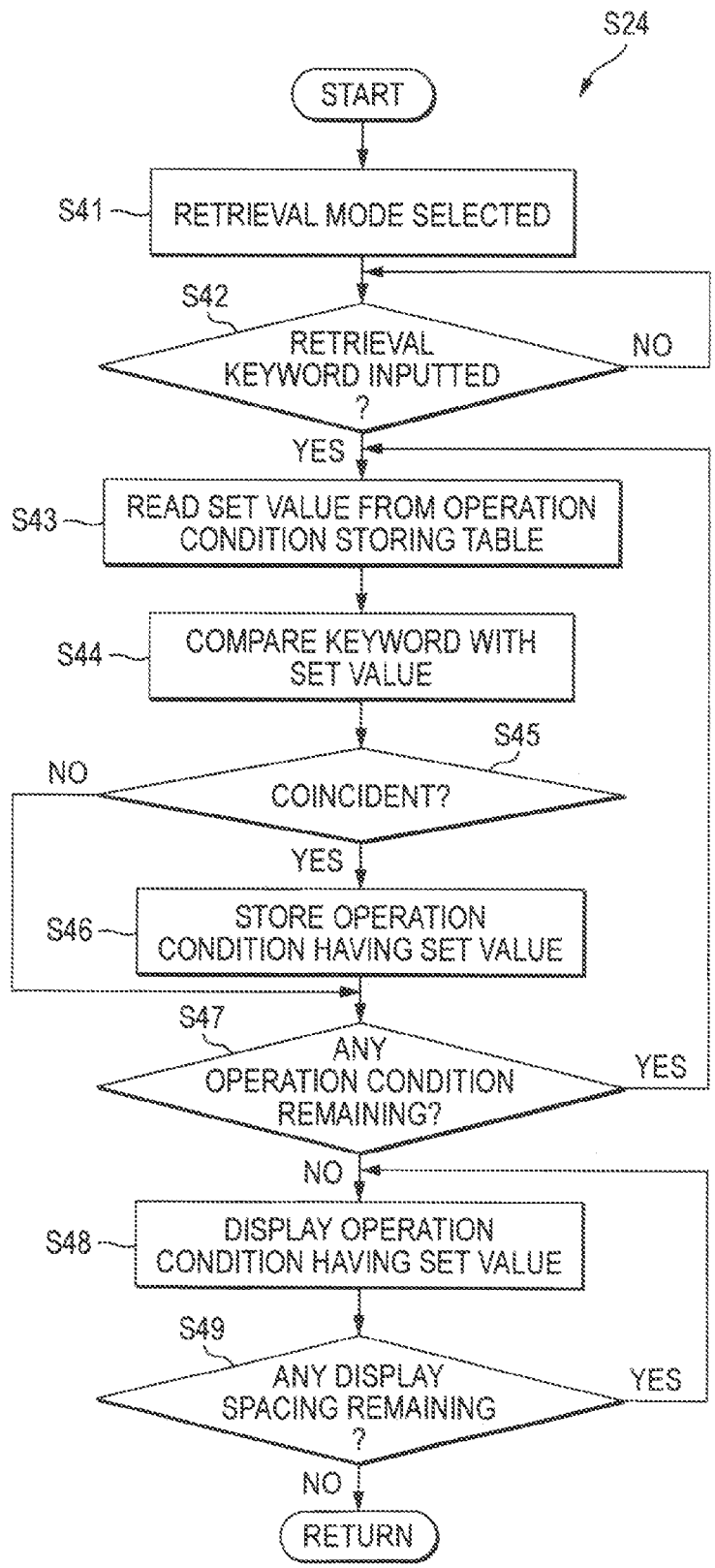
FIG. 12 is a flowchart showing a retrieval program according to an exemplary embodiment of the present invention.

Next, a description is given of the retrieval subroutine S24 with reference to FIG. 12 through FIG. 14. FIG. 12 is a flowchart showing a series of operations that the CPU 21 carries out based on the retrieval program 22C. FIG. 13 and FIG. 14 show examples of the display screen that displays the retrieval results.

Turning to FIG. 12, if the CPU 21 determines that the retrieval of setting items is selected (S23: YES), the CPU 21 selects the retrieval mode (S41). Subsequently, the CPU 21 determines whether a retrieval keyword is input in the retrieval bar 56 (S42). If no operation is performed and the CPU 21 determines that no keyword is input(S42: NO), the CPU 21 performs operation S42 again. In contrast, if the ten keys 40G are operated and a keyword is input in the retrieval bar 56, the CPU 21 determines that a retrieval keyword is input (S42: YES), and reads a setting item that is input as the retrieval keyword and the set values from one of the operation conditions included in the operation condition storing table 10 (S43). Herein, it is advantageous that the setting item and set value are input as the retrieval keyword. Also, the method for inputting the retrieval keyword is not limited to the method based on operation of the ten key 40G, but may be brought about by selecting the setting item and set value as the choices. In addition, the retrieval keyword is not limited to one, wherein a plurality of keywords may be inputted.

Next, the CPU 21 compares the setting item and set value, which are read from the operation condition storing table 10, with the keywords (S44), and determines whether they are coincident with each other (S45). If it is determined that the setting item and set value are coincident with the keyword (S45: YES), the CPU 21 stores the operation condition in the RAM 23 (S46). In contrast, if it is determined that the setting item and set value are not coincident with the keyword (S45: NO), or after the operation condition is stored (S46), the CPU 21 determines whether there are any operation conditions for which set value has still not been compared with the keyword (S47).

If it is Determined that there Still are Operation conditions which have not been compared (S47: YES), the CPU 21 returns to operation S43. In contrast, if it is determined that there is no setting item and set value which are not compared (S47: NO), the CPU 21 displays the operation conditions, which are coincident with the keyword, on the liquid crystal display portion 41 (S48).

Next, the CPU 21 determines whether there is any spacing in which the operation condition that is coincident with the keyword is displayed (S49). This may be sufficient only by comparing the number of operation conditions that can be displayed, with the number of the operation conditions that are displayed at present. If it is determined that there is still spacing for display (S49: YES), the CPU 21 further displays the operation conditions. In contrast, if it is determined that there is no spacing for display (S49: NO), the CPU 21 terminates the retrieval program 22C and returns to the operation condition execution program 22B of FIG. 10.

Thus, when the retrieval subroutine is finished, the retrieval results shown in FIG. 13 or FIG. 14 are displayed on the liquid crystal display portion. FIG. 13 or FIG. 14 are examples of the display screen that displays the retrieval results when "Sheet Type: Plain paper" is input as the retrieval keyword. In FIG. 13, the operation condition for which a plain sheet is set as the sheet type is displayed in the operation condition display areas 51, 52. Also, in FIG. 14, three or more operation conditions that are coincident with the retrieval keyword are simultaneously displayed. Thus, the operation conditions that are coincident with the retrieval keyword may be plurally displayed. In addition, the setting items and set values displayed in the operation condition display areas of FIG. 13 and FIG. 14 are displayed with the setting items and set values, which are coincident with the retrieval keyword displayed in the uppermost rank. In FIG. 13 and FIG. 14, the sheet type and plain sheet are displayed at the uppermost rank. In addition, in regard to the operation condition not displayed although being coincident with the retrieval keyword, the operation condition can be displayed by selecting the cursor button 54.

Further, the peripheral apparatus 1 according to an exemplary embodiment of the present invention includes a document size sensor 24 and a recording sheet size sensor 25, which can detect the sizes of the set documents and recording sheets. In the retrieval subroutine S24, when inputting the retrieval keyword (S42), the CPU 21 may automatically provide the size of recording sheets, which is detected by the sheet size sensor 25, in the retrieval bar 56 as a set value of the sheet type. Also, based on the sizes detected by the document size sensor 24 and the sheet size sensor 25, the CPU 21 may calculate the magnification/reduction ratio, and may automatically input the result of calculation in the retrieval bar 56 as the set values of magnification/reduction. In addition, when a document is set on the document table equipped on the upper part of the scanner portion 3 with respect to detection of the document size, the document size may be detected by pre-scanning, etc.

Thus, since the operation conditions including the set values can be retrieved, the operation conditions displayed on the display screen may be limited to only those operation conditions matching the input retrieval characteristics. Therefore, it is possible to save labor and time in selecting the operation conditions. In addition, in a peripheral apparatus having a limited display area available, the limited display area can be effectively used. Furthermore, if the retrieval set value is automatically set, labor and time for inputting the retrieval keyword may be saved, and at the same time, the retrieval keyword may be correctly input, wherein it is possible to further efficiently retrieve desired operation conditions.

Figure 15:
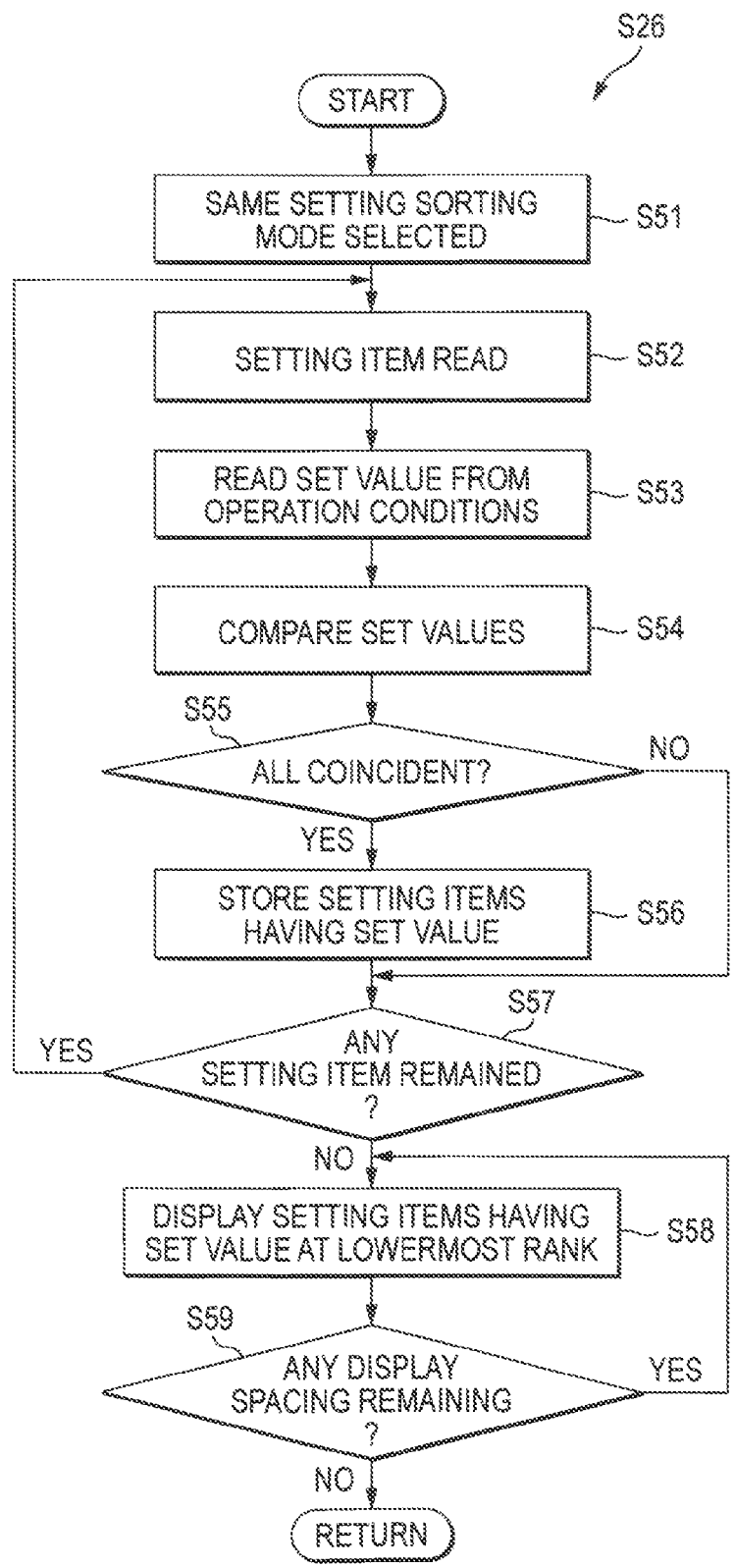
FIG. 15 is a flowchart showing a sorting program according to an exemplary embodiment of the present invention.

Next, a description is given of the same setting sorting subroutine S26 with reference to FIG. 15 and FIG. 16. FIG. 15 is a flowchart showing a series of operations, which are carried out by the CPU 21 based on the sorting program 22D. FIG. 16 shows an example of a display screen showing the result of sorting.

In FIG. 10, if it is determined that the same setting sorting status is turned ON (S25: YES), the CPU 21 selects the same setting sorting mode (FIG. 15, S51). Continuously, the CPU 21 selects one of the setting items of operation conditions displayed on the liquid crystal display portion 41 (S52). Subsequently, the CPU 21 reads all of the set values of the selected setting items from the displayed operation conditions (S53). Next, the CPU 21 executes comparison of the read set values (S54), and determines whether all of the set values are coincident.

If it is determined that all of the set values are coincident (S55: YES), the CPU 21 stores the setting items having the coincident set values in the RAM 23 along with the set values (S56). In contrast, if it is determined that all of the set values are not coincident (S55: NO), the CPU 21 determines whether there are any setting items for which the set values are not compared, in the setting items displayed (S57).

If it is determined that there are setting items for which the set values are not compared (S57: YES), the CPU 21 repeats operation S52 for the setting items for which the set values are not compared (S52). In contrast, if it is determined that there is no setting item for which the set values are not compared (S57: NO), the setting items stored in the RAM 23 are displayed at the lowermost rank of the display screen along with the set values thereof (S58). Then, the setting items for which all of the set values are coincident are deleted from the operation condition display area, and if there are any setting items not displayed yet, these setting items may be moved up and displayed.

Next, the CPU 21 determines whether there is still display spacing (S59). If it is determined that there is still display spacing, the CPU 21 displays the setting items stored in the RAM 23 at the lowermost rank along with the set values. In contrast, if it is determined that there is no display spacing remaining, the CPU 21 finishes the sorting program 22D and returns to the operation condition execution program 22B of FIG. 10.

Thus, when the same setting sorting subroutine is finished, the sorting result as shown in FIG. 16 is displayed on the liquid crystal display portion 41. In FIG. 16, since all of the set values of [Color adjust R], [Color adjust B] and [Sheet type] are coincident in the displayed operation conditions, these setting items will be displayed in the same setting value display area 57 of the display screen. Also, with respect to the setting items not displayed although all of the set values are coincident, if the scroll bar 45 is selected, the setting items can be displayed by vertical operation of the cursor key 40B. In this exemplary embodiment, the same setting value display area 57 is displayed on one screen with the other five setting items since there are only five setting items, sheet size, brightness, color adjust G and type of input image, for which the set values of respective operation conditions are different from each other. However, if there are more setting items for which the set values are different from each other, the same setting value display area 57 cannot be displayed in one screen, wherein the same setting items may be displayed by using the scroll bar 45. Also, where the setting items are not accommodated in one screen, the items with which the set values are coincident are deleted from the operation condition display area, and the setting items not displayed may be moved up and displayed.

Thus, since the setting items with which the set values are coincident are moved to the same setting value display area 57 of the display screen, the setting items for which the set values are different from each other are displayed with priority, making it easy to compare only those items that are different. Therefore, it is possible to save labor and time used in selecting among the operation conditions. In addition, since the setting items with which the set values are coincident are deleted from the operation condition display area, the limited display area can be effectively used.

Figure 17:
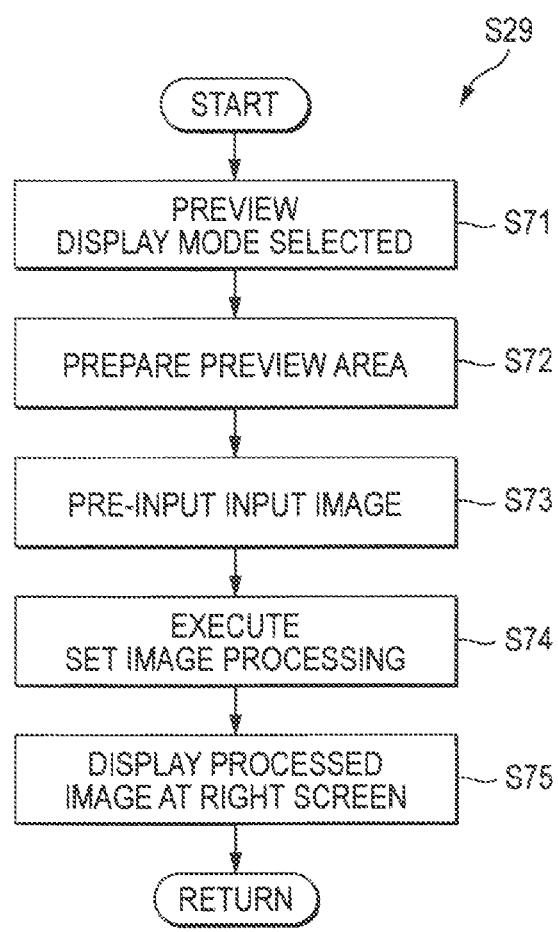
FIG. 17 is a flowchart showing a preview display program according to an exemplary embodiment of the present invention.
Figure 20:
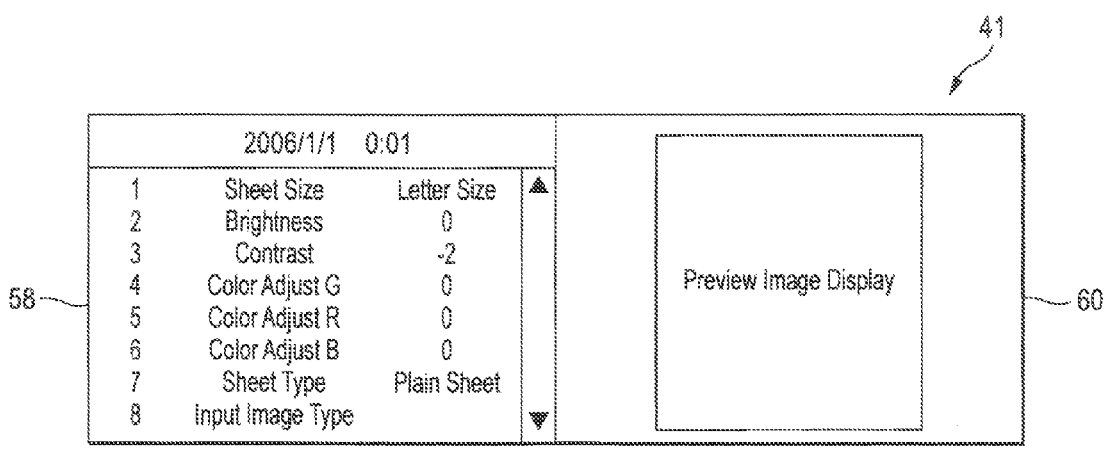
FIG. 20 shows an example of a display screen displaying the result of preview display.

Next, a description is given of a preview display subroutine S29 with reference to FIG. 17 and FIG. 20. FIG. 17 is a flowchart showing a series of operations that the CPU 21 carries out based on the preview display program 22F. FIG. 20 shows an example of a display screen that displays the preview display result.

In FIG. 10, the CPU 21 selects the preview display mode (FIG. 16, S71) when it is determined that preview display is executed (S28: YES). Next, the CPU 21 prepares a selected operation condition display area 58 for displaying selected operation conditions and a preview area 60 for displaying a preview in the liquid crystal display portion 41 (S72). Herein, the preview display area 60 is an area for displaying a result before printing, which is obtained by pre-scanning an input image before making a copying operation, and processing the image based on selected operation conditions.

Subsequently, the CPU 21 carries out pre-scanning of a document by driving the scanner portion 3 (S73). Either an entire sheet or a part thereof may be read by the scanner portion 3.

Next, the CPU 21 reads the set values of selected operation conditions, and processes the image of image data read based on the set value (S74). For example, an image process carried out may carry out chromatic adjustment based on the set values of color adjustment R, G, and B and layout processing based on the set values of layout, etc. The image process is carried out for each of the set values of respective setting items. Next, the CPU 21 displays an after-processing image in the preview area 60 as shown in FIG. 20 (S75). The preview area 60 is not limited to a display pattern as shown in FIG. 20. It may be devised that the preview area 60 occupies a larger or smaller area than the display area occupied by the selected operation condition display area 58.

Thus, according to this exemplary embodiment of the present invention, it is possible to check the image-processing result of an image to be processed based on the selected operation conditions by print preview, etc. Therefore, it is possible to easily judge which operation condition is most suitable for an image to be processed.

Although the present invention has been described based on the above-described exemplary embodiments, the present invention is not limited to the above-described exemplary embodiments. It will be understood that the present inventive concept may be subjected to various improvements and modifications within the scope not departing from the spirit of the present invention. For example, although the description was given of an operation condition of copying, a similar configuration may be composed with respect to operation conditions of printer, facsimile, or scanner functions equipped with the peripheral apparatus 1.

While the present invention has been shown and described with reference to certain exemplary embodiments thereof, it will be understood by those skilled in the art that various changes inform and details may be made therein without departing from the spirit and scope of the invention as defined by the appended claims.

What is claimed is:

1. A peripheral apparatus comprising:
  a display, the peripheral apparatus being configured to process input images based on one of a plurality of operation conditions displayed on the display, each of the operation conditions comprising a plurality of set items that are common among the plurality of operation conditions, each of the set items comprising a plurality of possible set values;
  a setting unit that sets a set value for each of the plurality of set items;
  an operation condition storing unit that stores the plurality of operation conditions and associated set items and set values; and
  a display controlling unit that controls the display to simultaneously display an array of the plurality of operation conditions, along with the plurality of setting items and set values that correspond to each of the respective operating conditions, on the display.

2. The peripheral apparatus according to claim 1, further comprising:
a retrieving unit that retrieves, from the operation condition storing unit, selected operation conditions, among the plurality of operating conditions, that correspond to selected set values and set items,
wherein the display controlling unit displays on the display only the selected operation conditions retrieved by the retrieving unit.

3. The peripheral apparatus according to claim 2, wherein the selected set values are automatically set.

4. The peripheral apparatus according to claim 1, further comprising:
a comparing unit that compares the set values of the setting items displayed by the display,
wherein the display controlling unit displays on the display setting items whose set values differ from each other prior to setting items whose set values are the same as each other.

5. The peripheral apparatus according to claim 4, wherein the display controlling unit does not display setting items whose set values are the same as each other.

6. The peripheral apparatus according to claim 1, wherein the set values comprise a type of an input image.

7. The peripheral apparatus according to claim 1, further comprising:
an operation condition selecting unit that selects one of the plurality of operation conditions that are displayed on the display; and
a result displaying unit that displays on the display a processing result obtained by processing the input image based on the operation condition selected by the operation condition selecting unit.

8. A peripheral apparatus comprising:
an operation condition storing unit that stores a plurality of operation conditions, the operating conditions controlling processing of images by the peripheral apparatus, each operating condition comprising a plurality of set items that are common among the plurality of operation conditions, each set item comprising a plurality of possible set values;
a setting unit that sets a set value among the plurality of possible set values for each of the set items;
a display comprising at least two display areas; and
a display controlling unit that controls the display to display one of the plurality of operation conditions in each of the at least two display areas.

9. The peripheral apparatus according to claim 8,
wherein the at least two display areas comprise a first display area and a second display area, and
wherein the display controlling unit controls the display to display the plurality of possible set values associated with a current one of the plurality of set items in the first display area and a history of previously set items and corresponding set values in the second display area.

10. The peripheral apparatus according to claim 8,
wherein the at least two display areas comprise a first display area and a second display area, and
wherein the display controlling unit controls the display to display the plurality of set items and corresponding set values of a first operation condition in the first display area and the plurality of set items and corresponding set values of a second operation condition in the second display area.

11. The peripheral apparatus according to claim 8,
wherein the at least two display areas comprise a first display area and a second display area, and
wherein the display controlling unit controls the display to display the plurality of set items and corresponding set values of a first operation condition in the first display area and the plurality of set values corresponding set items of a plurality of remaining operation conditions in the second display area.

12. The peripheral apparatus according to claim 8, further comprising:
a comparing unit that compares the set values of set items of the plurality of operating conditions,
wherein the display controlling unit controls the display to display set items whose set values differ from each other with higher priority that set items whose set values are the same as each other.

13. The peripheral apparatus according to claim 12, wherein the display controlling unit controls the display to not display setting items whose set values are the same as each other.

14. The peripheral apparatus according to claim 8, wherein the display controlling unit controls the display to display the at least two of the plurality of operation conditions displayed in each of the at least two display areas simultaneously.

15. The peripheral apparatus according to claim 8, wherein the display controlling unit controls the display to display one of the plurality of operation conditions, along with the plurality of set items and set value that correspond to each of the respective operating conditions, in the at least two display areas simultaneously.

* * * * *